United States Patent
Decke et al.

(10) Patent No.: US 10,277,404 B2
(45) Date of Patent: Apr. 30, 2019

(54) COMMUNICATION SYSTEM FOR THE DETECTION OF A DRIVING LICENSE

(71) Applicant: VOLKSWAGEN AG, Wolfsburg (DE)

(72) Inventors: Hendrik Decke, Braunschweig (DE); André Oberschachtsiek, Braunschweig (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/673,549

(22) Filed: Aug. 10, 2017

(65) Prior Publication Data

US 2018/0054317 A1    Feb. 22, 2018

(30) Foreign Application Priority Data

Aug. 19, 2016 (DE) .................. 10 2016 215 630

(51) Int. Cl.
| | |
|---|---|
| *H04L 9/32* | (2006.01) |
| *B60R 25/24* | (2013.01) |
| *G06K 7/10* | (2006.01) |
| *H04L 9/08* | (2006.01) |

(52) U.S. Cl.
CPC ............ *H04L 9/3247* (2013.01); *B60R 25/24* (2013.01); *G06K 7/10376* (2013.01); *G06K 7/10415* (2013.01); *H04L 9/0897* (2013.01); *H04L 9/3226* (2013.01); *H04L 9/3263* (2013.01); *H04L 9/3273* (2013.01); *B60R 2325/108* (2013.01); *H04L 2209/84* (2013.01)

(58) Field of Classification Search
CPC ... H04L 9/3247; B60R 25/24; G06K 7/10376; G06K 7/10415

USPC .................................................. 340/5.8–5.86
See application file for complete search history.

(56) References Cited

U.S. PATENT DOCUMENTS

| | | | | |
|---|---|---|---|---|
| 6,910,628 | B1 * | 6/2005 | Sehr .................. | G06Q 10/02 235/384 |
| 6,926,203 | B1 * | 8/2005 | Sehr .................. | G06Q 10/025 235/382 |
| 2005/0177284 | A1 * | 8/2005 | Kugumiya ........... | H04L 63/0428 701/1 |
| 2005/0216153 | A1 * | 9/2005 | Cho .................... | G07C 5/0858 701/33.4 |
| 2011/0087401 | A1 * | 4/2011 | Tsao ................... | B60Q 1/50 701/36 |
| 2013/0088600 | A1 * | 4/2013 | Wu .................... | G08G 1/054 348/149 |

FOREIGN PATENT DOCUMENTS

| | | |
|---|---|---|
| DE | 19936528 A1 | 2/2001 |
| DE | 102009035654 A1 | 2/2011 |
| DE | 202011105142 U1 | 1/2012 |
| DE | 102012009019 A1 | 11/2013 |
| DE | 202015100748 U1 | 7/2015 |
| EP | 1495927 A2 | 1/2005 |
| EP | 1568555 A1 | 8/2005 |

\* cited by examiner

*Primary Examiner* — Allen T Cao
(74) *Attorney, Agent, or Firm* — Barnes & Thornburg LLP

(57) ABSTRACT

A communication system for verifying a driving license, having an electronic vehicle key and a reading device which communicates with the electronic vehicle key. The driving license data is stored on the electronic vehicle key and the reading device retrieves the driving license data stored on the electronic vehicle key.

26 Claims, 1 Drawing Sheet

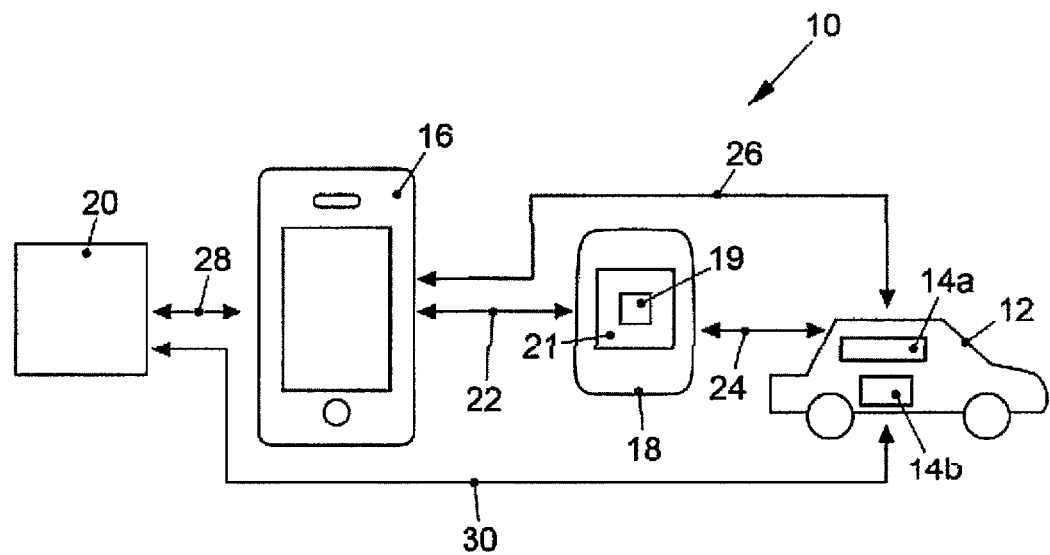

COMMUNICATION SYSTEM FOR THE DETECTION OF A DRIVING LICENSE

PRIORITY CLAIM

This patent application claims priority to German Patent Application No. 10 2016 215 630.6, filed 19 Aug. 2016, the disclosure of which is incorporated herein by reference in its entirety.

SUMMARY

Illustrative embodiments relate to a communication system for verifying a driving license and to an electronic vehicle key.

BRIEF DESCRIPTION OF THE DRAWINGS

The disclosed embodiments are explained below based on the associated drawing, in which:

FIG. 1 shows a schematic illustration of an exemplary embodiment of the disclosed communication.

DETAILED DESCRIPTION

The functionality of electronic vehicle keys will increase further in future. For example, electronic vehicle keys will not only be able to be used to lock and unlock the vehicle doors but will likewise be able to contain digital official documents.

However, the increasing variety of functions of an electronic vehicle key is opposed by its small size which considerably restricts the operating comfort. A compact electronic vehicle key may only have a limited number of input elements and can optically provide the user with information to a restricted extent.

The document DE 20 2011 105 142 U1 discloses, for example, an electronic vehicle key having an integrated color display which also has a combined function and menu key and extended touchscreen technology for remotely operating the vehicle access and authorization system.

However, the touchscreen of an electronic vehicle key may also have only restricted dimensions so that the manageability of the electronic vehicle key is not impaired. Touchscreens of this size are suitable neither for clearly reproducing information nor for conveniently managing digital official documents. On the other hand, if the dimensions of the installed touchscreen are increased, the comfort of use is considerably impaired since it is no longer possible to conventionally carry the electronic vehicle key, for example, on a keyring.

In addition, the integration of display devices, such as touchscreens, and the equipment of an electronic vehicle key with a plurality of communication modules result in a considerably increased energy requirement. However, on account of the small size of an electronic vehicle key, only batteries having a restricted size and therefore a limited capacity can be installed. Additional electronic components result in a rapid discharge, as a result of which the user is forced to regularly replace the batteries. In the case of a rechargeable vehicle key battery, regular charging is required. Both the replacement of the batteries and the charging of the vehicle key battery result in a considerable impairment in the comfort of use.

To verify a driving license, various solutions are known in the prior art.

The document DE 10 2012 009 019 A1 proposes a method for operating a vehicle, data relating to a general driving authorization to drive motor vehicles being automatically acquired using acquisition means of the vehicle and the data being automatically checked so that a function of the vehicle can be activated if the checking of the data led to a positive result. In this case, the general driving authorization is, for example, a driving license which is issued by an official authority.

The document DE 20 2015 100 748 U1 discloses an apparatus for controlling vehicles, the apparatus comprising a memory unit, a reading unit and a processor unit. The memory unit stores main data uniquely assigned to a vehicle. The reading unit is used to acquire the data stored in an electronic driving license. The processor unit is designed to acquire main data from the memory unit, to obtain the data stored in the electronic driving license via the reading unit and to generate a transmission signal for a remote device which contains the main data acquired from the memory unit and the data acquired from the electronic driving license.

Furthermore, the document EP 1 568 555 A1 discloses an authentication apparatus which comprises a communication unit inside the vehicle for communicating with an electrical license card which stores license card information including an item of identification information relating to a driver. The proposed authentication apparatus also has an authentication unit for authenticating the license card information and an activation unit for activating a function of the vehicle. The activation unit is set up to activate a corresponding vehicle function on the basis of activation information if the authentication of the license card information by the authentication unit was successful.

However, the known solutions always require the existence of a separate object which can be used to verify a driving license.

In this respect, the document DE 199 36 528 A1 describes a motor vehicle having a reader for a data storage medium to be carried by a user and to be brought into contact with the reader before using the vehicle. Personal data relating to the user are stored on the data storage medium. The data storage medium can also replace an ignition key.

The document EP 1 495 927 A2 describes a function control system in a motor vehicle having a control device and a chip card. A predetermined engine characteristic corresponding to the chip card can be set and/or a predetermined chassis characteristic corresponding to the chip card can be set using the control device and operating parameters and/or program additions provided by the chip card. The chip card may also have the function of an electronic ignition key.

The document DE 10 2009 035 654 A1 describes an apparatus for access authentication in a vehicle. The apparatus comprises a radio module for interchanging radio signals between the radio module and the vehicle via a radio interface to carry out contactless access authentication in the vehicle.

Disclosed embodiments make it possible to simplify the verification of the driving license.

The disclosed communication system for verifying a driving license comprises an electronic vehicle key and a reading device. The reading device is set up to communicate with the electronic vehicle key. According to the disclosed embodiments, driving license data are stored on the electronic vehicle key, and the reading device is set up to retrieve the driving license data stored on the electronic vehicle key.

In the disclosed communication system, apart from the electronic vehicle key, no further object is needed to verify a driving license. As a result of the fact that the driving license data are stored on the electronic vehicle key and the reading device is set up to retrieve the driving license data stored on the electronic vehicle key, a person can conveniently verify an available and valid driving license using the electronic vehicle key. For example, such a communication system can be used in traffic checks in which the driving license of the vehicle driver is checked. Another field of application is vehicle rental. For example, a vehicle rental company can use the disclosed communication system to check quickly and in an uncomplicated manner whether the person interested in renting the vehicle has a suitable and valid driving license.

The driving license data on the electronic vehicle key may comprise information relating to an authorization of a person to drive particular vehicles on the public highway. The electronic vehicle key uses a first communication module inside the key to communicate with the reading device. For example, the communication between the reading device and the electronic vehicle key takes place at 20 kHz, 125 kHz, 130 kHz, 433 MHz, 868 MHz or 315 MHz by BLUETOOTH®, infrared, RFID, mobile radio, Internet or using a local area network. To increase the convenience, the electronic vehicle key may have a display or a touchscreen.

The reading device may be set up to display the driving license data stored on the electronic vehicle key. As a result of the fact that the driving license data stored on the electronic vehicle key can be displayed on the reading device, the driving license data can be checked without a separate display device. This further simplifies the verification of a driving license. Alternatively or additionally, the reading device may also have a communication interface which can be coupled to a separate display device. The driving license data can therefore be seen, for example, by persons or institutions remote from the electronic vehicle key and the reading device.

The communication system may also have a vehicle, the electronic vehicle key being set up to communicate with the vehicle. The vehicle may be set up to retrieve the driving license data stored on the electronic vehicle key. As a result of the fact that the vehicle is set up to retrieve the driving license data stored on the electronic vehicle key, the driving license data can be checked by the vehicle. For example, the vehicle is set up to release individual or all vehicle functions if the driving license data have been successfully checked. The vehicle has a communication module inside the vehicle which is set up to communicate with the electronic vehicle key. The electronic vehicle key may use a second communication module inside the key to communicate with the communication module inside the vehicle. The first communication module inside the key and the second communication module inside the key may use different communication standards. For example, the communication between the electronic vehicle key and the communication module inside the vehicle takes place at 20 kHz, 125 kHz, 130 kHz, 433 MHz, 868 MHz or 315 MHz by BLUETOOTH®, infrared, RFID, mobile radio, Internet or using a local area network.

The vehicle may be set up to display the driving license data stored on the electronic vehicle key. For this purpose, the vehicle may have a display and/or a touchscreen. As a result of the fact that the vehicle is set up to display the driving license data stored on the electronic vehicle key, the driving license data can be checked by a person inside the vehicle. If a reading device is temporarily not available, for example, on account of a technical defect in the reading device, the checking of the driving license data is therefore considerably simplified. Furthermore, as a result of the driving license data being displayed by the vehicle, the vehicle driver can ensure that his driving license is still valid and/or provides authorization to drive a vehicle of a particular vehicle class. The driving license data may also provide, for example, information relating to whether the vehicle driver is authorized to drive a tractor-trailer combination of a tractor and a trailer and/or whether an accompanying person must be present in the vehicle in addition to the vehicle driver.

The electronic vehicle key may have a secure memory inside the key, the driving license data being stored in the secure memory inside the electronic vehicle key. The driving license data may comprise data in need of protection, for example, personal data relating to the driving license holder or data which define the extent of authorization of the driving license, which cannot be changed by third parties. The secure memory inside the electronic vehicle key therefore results in a considerable increase in security. Cryptographic material may be stored in the secure memory inside the electronic vehicle key. The cryptographic material in the secure memory inside the electronic vehicle key can be used to authenticate the electronic vehicle key with respect to the vehicle and/or with respect to the reading device. The cryptographic material in the secure memory inside the electronic vehicle key may comprise cryptographic key material, cryptographic certificates, authorization files and/or entity-related data. The entity-related data may also comprise biometric data, for example. The data in the secure memory inside the electronic vehicle key may be partially or completely stored as plain text or as a cipher and/or as ciphertext. The ciphertext may have been produced from plain text either by a reversible operation or by an irreversible operation. If the ciphertext has been produced from plain text by a reversible operation, the production operation can be reversed to produce the plain text from the ciphertext. If the ciphertext has been produced from plain text by an irreversible operation, the plain text cannot be produced from the ciphertext by reversing the production operation. The irreversible operation may be based on a hash function. As a result of the different cryptographic data in the secure memory inside the electronic vehicle key, the electronic vehicle key can be authenticated with respect to the vehicle on the basis of a wide variety of technologies, for example, mutual authentication based on Transport Layer Security (TLS) and a Public Key Infrastructure (PKI) or using the electronic vehicle key as a transaction number (TAN) generator. The security of the communication connection is therefore increased further. The data in the secure memory inside the electronic vehicle key are protected against changes by the reading device. The electronic vehicle key may also be set up to cryptographically protect notifications to be transmitted against modification and/or eavesdropping, in particular to cryptographically sign the notifications.

The driving license data on the electronic vehicle key may have a cryptographic signature. The cryptographic signature may comprise a certificate, for example. The certificate may have been issued by a certified certification authority, for example. The security level is again increased thereby.

The communication system may also comprise a central computer, the reading device being set up to communicate with the central computer. The central computer may be a server and/or a backend of a vehicle manufacturer or a third-party provider. The central computer may comprise a database which is accessed by a management system for managing driving licenses. For example, the central computer is connected to the Internet.

The reading device, the vehicle and/or the central computer may be set up to check the driving license data on the electronic vehicle key, in particular for authenticity and validity. As a result of the fact that the reading device, the vehicle and/or the central computer is/are set up to check the driving license data on the electronic vehicle key, the driving license check can be considerably simplified and expedited, for example. As a result of the checking possibilities of the central computer and the vehicle, it is possible to provide a system which continuously monitors the validity of driving licenses. Such a system allows a considerably more comprehensive check than the known sampling inspections carried out by corresponding authorities, for example.

The reading device may be a stationary reading terminal. Such a stationary reading terminal may be used, for example, in buildings, by authorities responsible for the road traffic or the suspicion of traffic rule violations. A stationary reading terminal communicates with the electronic vehicle key using near field communication, for example, to retrieve and/or check the driving license data stored on the electronic vehicle key.

The reading device may be a mobile terminal. The mobile terminal may be a smartphone or a tablet, for example. Corresponding mobile terminals are nowadays regularly carried by a majority of people. This overcomes the need to purchase a separate reading device, thus making it possible to achieve a high level of user acceptance. On account of the comparatively large display, mobile terminals are also suitable for clearly presenting the driving license data. To further increase the convenience, the electronic vehicle key may also have a display device, for example, a display or a touchscreen, which can be used to display the driving license data stored on the electronic vehicle key.

The electronic vehicle key may be set up to be controlled via the reading device. The generation, transmission and reception of information and/or control commands can be controlled by the electronic vehicle key via the reading device. The user having the reading device may therefore have functions of the electronic vehicle key without having to operate the electronic vehicle key itself. The reading device therefore provides the electronic vehicle key with its operating functionality, in particular by providing input elements such as pushbuttons, keys or a touchscreen, and/or its display functionality, in particular by providing a display and/or a touchscreen. The operating comfort of the electronic vehicle key is therefore considerably increased.

A vehicle management application may be installed on the electronic vehicle key and/or the reading device and is set up to access the driving license data stored on the electronic vehicle key. The vehicle management application is set up to establish a communication connection to the central computer, in particular via the Internet. Irrespective of whether the vehicle management application is installed on the electronic vehicle key and/or the reading device, the vehicle management application may be set up to cause data to be interchanged between the electronic vehicle key and the vehicle. A user may call up a user account via the vehicle management application, in particular by a user name and a password. Personal data relating to the user and information relating to the purchase transaction and/or driving license data may be stored in the user account.

The vehicle management application may be set up to display a graphical interface for retrieving and/or displaying the driving license data stored on the electronic vehicle key on the reading device. For example, the vehicle management application comprises a menu structure which is displayed to the user of the reading device. The user can cause data to be interchanged between the electronic vehicle key and the vehicle, for example, by appropriately selecting a menu item, for example, for the purpose of transmitting the driving license data. The graphical interface may be designed so that it allows comfortable operation via a touchscreen.

The reading device may be set up to release a communication module inside the device for the electronic vehicle key, the electronic vehicle key being set up to use the released communication module inside the reading device. The communication module inside the device may be, for example, a radio module which allows the connection to a local radio network and/or the establishment of a mobile radio connection. The communication possibilities of the electronic vehicle key are therefore extended without the necessary hardware therefor having to be present in the electronic vehicle key. This avoids further installation space being used and an additional energy requirement on account of additional communication units inside the electronic vehicle key. The service life of the vehicle key battery is therefore not impaired even though the communication ability of the electronic vehicle key is extended. The electronic vehicle key can be connected to the Internet via the released communication module of the reading device. An Internet connection of the electronic vehicle key also allows access to the electronic vehicle key by other devices which are connected to the Internet. For example, the electronic vehicle key can therefore be accessed from a remote position using a mobile terminal, for example, a smartphone or a tablet, or a personal computer if the Internet connectivity of the reading device is available to the electronic vehicle key.

The reading device may be set up to communicate directly with a communication module inside the vehicle. Therefore, not only direct communication between the electronic vehicle key and the vehicle but also direct communication between the reading device and the vehicle is possible. The communication module inside the vehicle which is used for communication between the reading device and the vehicle may be either the same communication module as that used for communication between the electronic vehicle key and the vehicle or another communication module inside the vehicle.

The electronic vehicle key may be a personalized and/or personal electronic vehicle key. Such a vehicle key may be issued by a vehicle manufacturer for use by a user or a group of users and is fundamentally not permanently tied to a specific vehicle. The user or the group of users can, for example, couple the electronic vehicle key to one or more vehicles via a corresponding management system, for example, via the central computer, or locally to be able to use these vehicles with the electronic vehicle key. Upon entering the vehicle, the user may be automatically registered with a customer account stored on the electronic vehicle key. The usage authorizations and/or purchased vehicle functions or purchased mobile online services may also be coupled to this customer account. For example, two-factor authentication is required for registration. The electronic vehicle key provides a cryptographic factor for the two-factor authentication, in particular proof of ownership. The electronic vehicle key is therefore also used as proof of authentication. Alternatively, the electronic vehicle key may also be a conventional vehicle-related vehicle key.

The electronic vehicle key may also be set up to communicate with a plurality of different vehicles, with a plurality of different mobile terminals and/or with a plurality of different reading devices. This makes it possible to use the electronic vehicle key for a plurality of vehicles. Usage authorizations of the user for the plurality of vehicles may be stored in the user's user account. If the electronic vehicle key is set up to communicate with a plurality of reading devices, the checking of the driving license data is considerably simplified. However, for reasons of security, it may be advisable or even necessary for the electronic vehicle key to be able to be coupled only to one mobile terminal at the same time to prevent misuse.

The electronic vehicle key may provide an open API (application programming interface). The reading device can communicate directly with the electronic vehicle key using an available communication technology, for example, BLUETOOTH®, NFC®, ZIGBEE®, USB. To protect the communication between the reading device and the electronic vehicle key, authentication can be carried out between the electronic vehicle key and the reading device. The authentication can be carried out on one side or on both sides. The presence of the counterpart station can be checked by the authentication. The communication between the reading device and the electronic vehicle key can also be encrypted and/or authenticated by choosing a cryptographic solution for protection. The vehicle management application and the logic may run on the reading device in this case. The vehicle management application can therefore access the functions and the memory, in particular the secure memory inside the electronic vehicle key.

Alternatively, a trusted execution environment (TEE) exists on the electronic vehicle key. Only applications which have been approved or released by the manufacturer of the vehicle may run in this execution environment. These applications may also only be introduced into the execution environment via a secure process. The form of this process depends on the technology used in the execution environment. The reading device may be set up to establish a remote maintenance session with the electronic vehicle key during coupling, for example, using Virtual Network Computing. In this case, the reading device is used as a pure display and operating device and/or is used as an interface to the Internet. The vehicle management application, therefore, runs on the electronic vehicle key and the interfaces and graphics are also provided by the vehicle management application on the electronic vehicle key. These interfaces are then transmitted to the reading device for display. Conversely, the reading device transmits control commands and/or data from the Internet to the electronic vehicle key in the secure environment. The application logic therefore runs completely on the electronic vehicle key and is, therefore, under the control of the vehicle manufacturer. The data from the mobile terminal, for example, the control commands and/or the data from the Internet, may be protected or authenticated, with the result that no incorrect or manipulated data can enter the secure execution environment.

The user data may be protected on the reading device and/or the electronic vehicle key. For example, protection is effected by a pin or password request during connection between the reading device and the electronic vehicle key. This offers straightforward and simple access protection against manipulation.

Driving license data are stored on the electronic vehicle key, and the electronic vehicle key is set up to provide a reading device with the stored driving license data. The electronic vehicle key may be designed for use with a communication system according to at least one of the embodiments described above. The same benefits and modifications as described above with respect to the electronic vehicle key of the communication system apply to the electronic vehicle key.

Further configurations of the disclosure emerge from the other features mentioned. The different embodiments mentioned in this application can be combined with one another, unless stated otherwise in the individual case.

FIG. 1 shows a communication system 10 for verifying a driving license. The communication system 10 comprises a vehicle 12, a reading device 16, an electronic vehicle key 18 and a central computer 20.

The vehicle 12 has two communication modules 14a, 14b inside the vehicle. The vehicle 12 communicates with the electronic vehicle key 18 using the communication module 14a inside the vehicle. The communication connection 24 based on the BLUETOOTH® standard is used for communication between the communication module 14a inside the vehicle and the electronic vehicle key 18. The vehicle 12 communicates with the reading device 16 and the central computer 20 using the communication module 14b inside the vehicle. The communication connection 26 based on mobile radio is used for communication between the communication module 14b inside the vehicle and the reading device 16. The communication connection 30 based on mobile radio is used for communication between the communication module 14b inside the vehicle and the central computer 20.

The electronic vehicle key 18 is a personalized and personal electronic vehicle key 18 and has a secure memory 21 inside the key which stores driving license data 19. The driving license data 19 on the electronic vehicle key 18 comprise information relating to a person's authorization to drive particular vehicles on the public highway and have a cryptographic signature. Cryptographic material is also stored in the secure memory 21 inside the electronic vehicle key 18. The cryptographic material in the secure memory 21 inside the electronic vehicle key 18 comprises cryptographic key material, cryptographic certificates, authorization files and entity-related data, the data in the secure memory 21 inside the electronic vehicle key 18 being protected from changes by the mobile terminal.

The reading device 16 may be a mobile terminal, specifically a smartphone. The reading device 16 communicates with the electronic vehicle key 18 via the communication connection 22 which may be a BLUETOOTH® connection. The reading device 16 also communicates with the central computer 20 via the communication connection 28. The communication connection 28 is an Internet connection which uses a mobile radio network. The reading device 16 is set up to retrieve and display the driving license data 19 stored on the electronic vehicle key 18.

The vehicle 12 and the central computer 20 are likewise set up to retrieve the driving license data 19 stored on the electronic vehicle key 18. The vehicle 12 can retrieve the driving license data 19 stored on the electronic vehicle key 18 either directly via the communication connection 24 or indirectly via the reading device 16. The driving license data 19 can be indirectly retrieved via the reading device 16, for example, by virtue of the reading device 16 releasing a communication module inside the device for the electronic vehicle key 18, the electronic vehicle key 18 then using the released communication module inside the reading device 16 for communication.

The electronic vehicle key 18 is set up to be controlled via the reading device 16. For this purpose, a vehicle management application is installed on the electronic vehicle key 18 and on the reading device 16. The reading device 16 can also access the driving license data 19 stored on the electronic vehicle key 18 by the vehicle management application.

The vehicle management application provides, on the reading device 16, a graphical interface for retrieving and displaying the driving license data 19 stored on the electronic vehicle key 18.

The central computer 20 is a backend of a vehicle manufacturer. The central computer 20 comprises a database which is accessed by a management system for managing driving licenses.

The reading device 16, the vehicle 12 and the central computer 20 are set up to check the driving license data 19 on the electronic vehicle key 18 for authenticity and validity.

As a result of the fact that driving license data are stored on the electronic vehicle key and the reading device is set up to retrieve the driving license data stored on the electronic vehicle key, the present disclosure considerably simplifies the verification of a driving license.

LIST OF REFERENCE SYMBOLS

10 Communication system
12 Vehicle
14a, 14b Communication modules inside the vehicle
16 Reading device
18 Electronic vehicle key
19 Driving license data
20 Central computer
21 Secure memory inside the key
22-30 Communication connections

The invention claimed is:

1. A communication system for verifying a driving license, the communication system comprising:
an electronic vehicle key; and
a reading device external to the electronic vehicle key configured to communicate with the electronic vehicle key;
wherein the reading device is configured to release a communication module inside the reading device for the electronic vehicle key, the electronic vehicle key configured to use the released communication module inside the reading device;
wherein driving license data are stored on the electronic vehicle key and the reading device is configured to retrieve the driving license data stored on the electronic vehicle key;
wherein the electronic vehicle key is configured to generate a graphical interface for displaying the driving license data stored on the electronic vehicle key; and
wherein the electronic vehicle key is configured to transmit the graphical interface to the reading device for display.

2. The communication system of claim 1, wherein the reading device is configured to display the driving license data stored on the electronic vehicle key.

3. The communication system of claim 1, further comprising a vehicle, wherein the electronic vehicle key is configured to communicate with the vehicle such that the vehicle retrieves the driving license data stored on the electronic vehicle key.

4. The communication system of claim 3, wherein the vehicle is configured to display the driving license data stored on the electronic vehicle key.

5. The communication system of claim 1, wherein the electronic vehicle key has a secure memory inside the key and the driving license data are stored in the secure memory inside the electronic vehicle key.

6. The communication system of claim 1, wherein the driving license data on the electronic vehicle key have a cryptographic signature.

7. The communication system of claim 1, further comprising a central computer, wherein the reading device is configured to communicate with the central computer.

8. The communication system of claim 1, wherein the reading device, the vehicle and/or the central computer is/are is configured to check the driving license data on the electronic vehicle key.

9. The communication system of claim 1, wherein the reading device is a stationary reading terminal.

10. The communication system of claim 1, wherein the reading device is a mobile terminal.

11. The communication system of claim 1, wherein the electronic vehicle key is controlled via the reading device.

12. The communication system of claim 1, wherein a vehicle management application is installed on the electronic vehicle key and/or the reading device and accesses the driving license data stored on the electronic vehicle key.

13. An electronic vehicle key, wherein driving license data are stored on the electronic vehicle key, and the electronic vehicle key provides a reading device with the stored driving license data,
wherein the reading device is external to the electronic vehicle key;
wherein the electronic vehicle key is configured to generate a graphical interface for displaying the driving license data stored on the electronic vehicle key; and
wherein the electronic vehicle key is configured to transmit the interface to the reading device for display;
wherein the electronic key has a first communication module and a second communication module, wherein the first communication module and the second communication module are configured to be capable of using different communication standards; and
wherein the first communication module communicates with the reading device and the second communication module is configured to communicate with a vehicle.

14. The electronic vehicle key of claim 13, wherein the electronic vehicle key is configured to communicate with a vehicle such that the vehicle retrieves the driving license data stored on the electronic vehicle key.

15. The electronic vehicle key of claim 13, wherein the electronic vehicle key has a secure memory inside the key and the driving license data are stored in the secure memory inside the electronic vehicle key.

16. The electronic vehicle key of claim 13, wherein the driving license data on the electronic vehicle key have a cryptographic signature.

17. The electronic vehicle key of claim 13, wherein the electronic vehicle key is controlled by the reading device.

18. The electronic vehicle key of claim 13, wherein a vehicle management application is installed on the electronic vehicle key and/or the reading device and accesses the driving license data stored on the electronic vehicle key.

19. The electronic vehicle key of claim 13, wherein the reading device releases a communication module inside the reading device for the electronic vehicle key, the electronic vehicle key uses the released communication module inside the reading device.

20. A method for enabling verification of a driving license, the method comprising:
configuring an electronic vehicle key for communication with a reading device external to the electronic vehicle key by storing driving license data on the electronic vehicle key;

releasing by the reading device a communication module inside the reading device;

using by the electronic vehicle key the released communication module inside the reading device, such that:

the reading device retrieves the driving license data stored on the electronic vehicle key;

the electronic vehicle key generates a graphical interface for displaying the driving license data stored on the electronic vehicle key; and the electronic vehicle key transmits the graphical interface to the reading device for display.

21. The method of claim 20, wherein the electronic vehicle key is further configured to communicate with a vehicle such that the vehicle retrieves the driving license data stored on the electronic vehicle key.

22. The method of claim 20, further comprising providing the electronic vehicle key with a secure memory inside the key, wherein the driving license data are stored in the secure memory inside the electronic vehicle key.

23. The method of claim 20, wherein the driving license data on the electronic vehicle key have a cryptographic structure.

24. The method of claim 20, wherein the electronic vehicle key is controlled via the reading device.

25. The method of claim 20, further comprising installing a vehicle management application on the electronic vehicle key and accesses the driving license data stored on the electronic vehicle key.

26. The method of claim 20, wherein the reading device releases a communication module inside the reading device for the electronic vehicle key, the electronic vehicle key uses the released communication module inside the reading device.

* * * * *